United States Patent [19]
Kleiner et al.

[11] 3,769,035
[45] Oct. 30, 1973

[54] PROCESS FOR SEALING TOASTER SANDWICH

[75] Inventors: Fredric Kleiner, New City; Harvey Philip Fogel, Goshen, both of N.Y.

[73] Assignee: General Foods Corporation, White Plains, N.Y.

[22] Filed: June 23, 1971

[21] Appl. No.: 155,964

[52] U.S. Cl. .................................. 426/244, 99/92
[51] Int. Cl. ............................................ A21d 13/00
[58] Field of Search ............................ 99/86, 87, 92

[56] References Cited
UNITED STATES PATENTS
2,060,490  11/1936  Borbely................................... 99/87

Primary Examiner—Raymond N. Jones
Assistant Examiner—James Robert Hoffman
Attorney—Bruno P. Struzzi et al.

[57] ABSTRACT

A process for sealing together two or more pieces of a foodstuff in which an edible carbohydrate material is spread on the areas to be sealed in the presence of moisture and the areas are then subjected to a high frequency alternating electric field for a time sufficient to heat and set the sealing material.

9 Claims, 3 Drawing Figures

PATENTED OCT 30 1973

3,769,035

INVENTOR.

BY

PROCESS FOR SEALING TOASTER SANDWICH

RELATED CASES

This case is related to the Assignee's copending U.S. Pat. application, Ott et al., Ser. No. 26,042 filed Apr. 6, 1970. Said application has been abandoned in favor of pending continuation U.S. Pat. application Ser. No. 209,378, filed Dec. 17, 1971.

BACKGROUND OF THE INVENTION

This invention relates to processes for sealing two or more pieces of a foodstuff together; more particularly it relates to such processes where the sealing is accomplished by heat.

In the related case mentioned above thereis disclosed a unique toaster sandwich product and a process for making it. Briefly, the sandwich comprises two slices of fresh bread with a slice of frozen filling within. An edible sealing material is spread on the edge area of one or both bread slices, the sandwich is placed in a heated mold and the upper heated platen of the mold is pressed down on the edge of the bread slices, whereby the sealing material is set and the sandwich is sealed. The product is then frozen, packaged and sold to the consumer. The frozen sandwich is designed to be heated in a toaster or oven prior to consumption such that the filling will not leak out as the sandwich thaws.

We have here invented an improved method of sealing the toaster sandwich specifically, or two or more pieces of any other foodstuff generally, by making use of a high frequency alternating field. Carbohydrates are preferred as the sealing material because of their ability to form a physical bond when acted upon by heat in the presence of moisture. In the process of this invention if the foodstuff is substantially moisture-free, a mixture of water and carbohydrate must be used for reasons that will be explained below. Where the foodstuff contains a substantial amount of moisture, the carbohydrate may also be applied in powder form.

In either of the preceding two cases the carbohydrate is spread around the areas of the foodstuff which are to be sealed and the areas are then subjected to a high frequency alternating electric field, sometimes referred to as a dielectric field. When the field is energized, water molecules, whether present in the mixture with the carbohydrate or within the foodstuff itself, will change orientation every time the electric field changes. As is well known, water molecules are essentially electrically negative at one end and positive at the other. This explains their response to changes in the electric field. If the frequency of change in the field is high enough, the water molecules will be so vigorously agitated as to generate the heat necessary to combine the carbohydrates with the water and form a pasty seal.

The following types of carbohydrates can be used to obtain the desired results: starches, both raw and pregelatinized; gums; dextrins; and film-forming sugar mixtures. The preferred carbohydrate for foodstuffs with or without substantial moisture content, is starch. Either raw starch or pregelatinized starch can be used. If the foodstuff is essentially dry, the starch must be combined with water since there would be no moisture present to act with the starch and enable it to act as a seal.

The process of this invention provides the advantage of quicker and more effective sealing, making it most adaptable to assembly line processes for making food products which comprise two or more pieces of sealed foodstuff.

DETAILED DESCRIPTION OF THE INVENTION

Figure 1:
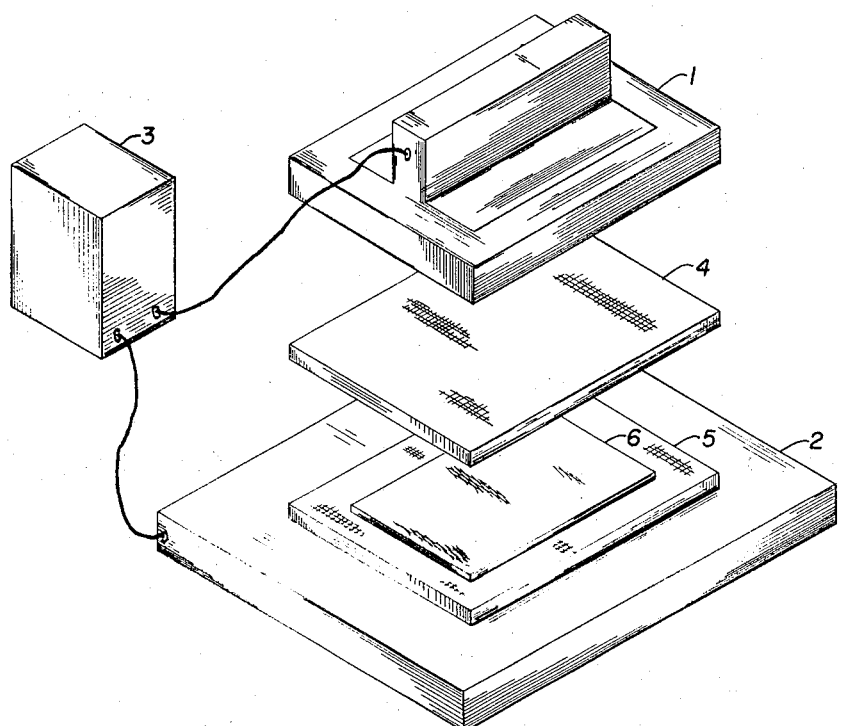
Figure 2:
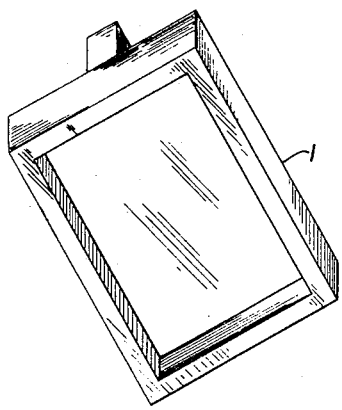
Figure 3:
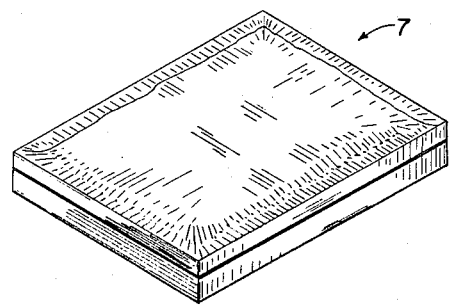

Referring to the drawings:

FIG. 1 is one illustration of how the invention may be practiced, showing an electric field generator with an exploded view of the toaster sandwich described above. FIG. 2 is a view of the top plate of the generator, in this case designed with a recess such that when it is brought directly over the sandwich, the electric field will be most intense at those areas of the sandwich which are to be sealed, namely the edges. In this form of the invention it is obvious that it would not be desirable to heat the middle of the sandwich and melt the filling. However, this feature so illustrated is specific only to this form of the invention. FIG. 3 is an isometric view of the final toaster sandwich product.

EXAMPLE I

The above form of practicing the invention will now be described using the drawings.

Regular bread is cut into crustless rectangular slices about ¼ inch thick. This is necessary since the sandwich must easily fit into a toaster. A viscous food filling of desired flavor such as bacon and egg, ham and cheese, or tuna fish, etc. is prepared and poured into a rectangular mold, the cross-sectional length and width of which are smaller than those of the bread slices. The filling is frozen in the mold so that no moisture will seep into the bread when the filling is in contact with it. Approximately ⅛ inch thick slices of filling are cut from the frozen block. One slice of the bread, 5, is placed on the lower plate, 2, which is connected to a radio frequency generator, 3. A small amount of a 6 percent aqueous suspension of modified hydrolyzed tapioca starch is spread around the edge area on the upper surface of bread slice, 5. A slice of the filling, 6, is placed on the bread, 5. A second slice of bread, 4, is placed directly on top of the first slice, 5, and the filling, 6, so that the edges of the second slice, 4, are aligned with those of the first slice, 5. The upper plate, 1, of FIG. 3 is brought down manually or mechanically over the sand-wich with its edge areas in registration with the edge area of the sandwich. Plate, 1, is brought to within one-fourth inch to one-third inch of the lower plate, 2. This will mean that the bread slices are compressed slightly around the edge area. The generator is energized for five seconds, at a frequency of 27 megahertz with the plate in this position. The sandwich is removed and observed to be well sealed around the edges. In this particular case the upper part of the sandwich, 7, is compressed at the edges due to the convergence of the plates. The polar water molecules are heated by agitation in the electric field. Under this heat the water is readily absorbed by the hydrolyzed starch, yielding a pasty starch residue around the edge of the sandwich which acts as the seal.

EXAMPLE II

The above example was repeated using a dry powdered pregelatinized modified tapioca starch. Approximately three-fourth grams of the starch was spread on the bread as above and subjected to a 25 second application of the electric field at a frequency of 27 megahertz. This time the heat necessary to combine the starch with the water was provided by agitation of the water molecules contained within the bread slice itself, since regular bread contains a good amount of moisture.

Raw starch can be used in the presence of moisture, since, as the moisture heats up in the electric field some of the moisture is driven into the raw starch, the starch then becomes gelatinized and further heating induces it to absorb more water and act as a seal. In any event it is seen that there must be a sufficient quantity of moisture present either within the foodstuff itself or mixed with the carbohydrate material.

The particular values of frequency of agitation (frequency of the electric field), generator voltage, time of energy application, distances between the plates during sealing, all depend upon the nature of the foodstuff, the type of carbohydrate used, the degree of sealing desired and the area of the foodstuff to be sealed. It should also be obvious to those skilled in the art that the process of this invention can be used whenever any other sealing material is desired which can be set by heat. In addition, it should also be obvious that water is not the only polar medium which may be used to generate the heat.

Having thus described our invention, what we claim is:

1. A process for sealing two or more pieces of baked leavened foodstuff together and having a filling therebetween which comprises: applying an edible carbohydrate sealing material capable of forming a physical bond when acted upon by heat in the presence of moisture to the areas of the foodstuff to be sealed in the presence of moisture; depositing a filling on one of said pieces; juxtaposing said pieces so that the sealing material on at least one of the areas on one piece is opposed and in contact with another area of a second piece and said filling is intermediate said pieces; and then subjecting said areas to a high frequency alternating electric field for a time sufficient to combine the carbohydrate with the moisture to provide the seal between the pieces.

2. The process of claim 1 where the carbohydrate is selected from the group consisting of starch, edible gums, dextrins.

3. The process of claim 2 where the foodstuff is bread.

4. The process of claim 2 where the moisture is present in a prepared mixture with the carbohydrate.

5. The process of claim 2 where the moisture is present within the foodstuff.

6. A process of sealing a toaster sandwich comprised of two slices of fresh bread and a slice of frozen food filling in between comprising, applying an edible starch sealing composition capable of forming a physical bond when activated by heat in the presence of moisture to the edge area on the inner surface of one bread slice, placing one of said bread slices opposite and in contact with the starch-coated edge area of the first slice, and then subjecting said area to a high frequency alternating electric field for a time sufficient to set the starch as a seal between the slices.

7. The process of claim 6 where the starch is hydrolyzed pregelatinized modified tapioca starch.

8. The process of claim 7 where said starch is in aqueous suspension.

9. The process of claim 6 where the starch is raw.

* * * * *